(12) United States Patent
Khalid

(10) Patent No.: US 11,689,622 B2
(45) Date of Patent: *Jun. 27, 2023

(54) EFFICIENT REAL TIME VEHICULAR TRAFFIC REPORTING AND SHARING

(71) Applicant: Charter Communications Operating, LLC, St. Louis, MO (US)

(72) Inventor: Saran Khalid, Denver, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/385,434

(22) Filed: Jul. 26, 2021

(65) Prior Publication Data
US 2021/0352146 A1 Nov. 11, 2021

Related U.S. Application Data

(63) Continuation of application No. 16/543,525, filed on Aug. 17, 2019, now Pat. No. 11,082,497.

(51) Int. Cl.
*H04L 67/12* (2022.01)
*H04W 8/00* (2009.01)
(Continued)

(52) U.S. Cl.
CPC ............. *H04L 67/12* (2013.01); *G08G 1/052* (2013.01); *G08G 1/094* (2013.01); *H04L 12/185* (2013.01);
(Continued)

(58) Field of Classification Search
CPC ....... H04L 67/12; H04L 12/185; H04L 69/18; H04W 4/44; H04W 8/005; H04W 48/10; G08G 1/052; G08G 1/094
(Continued)

(56) References Cited

U.S. PATENT DOCUMENTS 6,341,255 B1 * 1/2002 Lapidot ............ G08G 1/096775
701/428
11,082,497 B2 * 8/2021 Khalid .................. H04L 51/046
(Continued)

FOREIGN PATENT DOCUMENTS

WO WO 2016/159715 * 10/2016 ............ H04W 28/02

OTHER PUBLICATIONS

3rd Generation Partnership Project (3GPP), Technical Specification (TS) Group Services and System Aspects, "Service requirements for V2X services; Stage 1", TS 22.185 V15.0.0, Jun. 2018, 14 pages, http://www.3gpp.org/ftp//Specs/archive/22_series/22.185/22185-f00.zip.
(Continued)

*Primary Examiner* — Christopher R Crompton
(74) *Attorney, Agent, or Firm* — Otterstedt & Kammer PLLC

(57) ABSTRACT

In one aspect, an exemplary method for sharing traffic data among a plurality of vehicles includes: a first vehicle receiving current traffic data from at least a second vehicle over a first network protocol; the first vehicle transmitting current traffic data from the first vehicle and the current traffic data received from at least the second vehicle to a roadside unit over a second network protocol; the first vehicle receiving processed traffic data from the roadside unit over the second network protocol, the processed traffic data being based on the current traffic data received from the first vehicle and from at least the second vehicle; and the first vehicle transmitting the processed traffic data received from the roadside unit to at least the second vehicle over the first network protocol.

17 Claims, 7 Drawing Sheets

(51) Int. Cl.
*H04L 69/18* (2022.01)
*G08G 1/052* (2006.01)
*H04W 48/10* (2009.01)
*H04W 4/44* (2018.01)
*G08G 1/09* (2006.01)
*H04L 12/18* (2006.01)

(52) U.S. Cl.
CPC .............. *H04L 69/18* (2013.01); *H04W 4/44* (2018.02); *H04W 8/005* (2013.01); *H04W 48/10* (2013.01)

(58) Field of Classification Search
USPC ........................................................ 370/312
See application file for complete search history.

(56) References Cited

U.S. PATENT DOCUMENTS

| | | | |
|---|---|---|---|
| 2016/0358477 | A1 | 12/2016 | Ansari |
| 2017/0243485 | A1* | 8/2017 | Rubin ................ G08G 1/052 |
| 2019/0204108 | A1 | 7/2019 | Benincasa et al. |
| 2019/0364492 | A1 | 11/2019 | Azizi et al. |
| 2020/0008018 | A1 | 1/2020 | Moustafa et al. |
| 2020/0059767 | A1 | 2/2020 | Woo et al. |
| 2020/0228948 | A1* | 7/2020 | Watfa ................ H04W 48/14 |
| 2020/0229206 | A1 | 7/2020 | Badic et al. |
| 2021/0005966 | A1 | 1/2021 | Tran et al. |
| 2021/0051198 | A1 | 2/2021 | Khalid |

OTHER PUBLICATIONS

3rd Generation Partnership Project (3GPP), Technical Specification (TS) Group Services and System Aspects, "Enhancement of 3GPP support for V2X scenarios; Stage 1"; TS22.186 V16.2.0, Jun. 2019, 18 pages, http://www.3gpp.org/ftp//Specs/archive/22_series/22.186/22186-g20.zip.

3rd Generation Partnership Project (3GPP), Technical Specification (TS) Group Services and System Aspects, "Service requirements for the Evolved Packet System (EPS)", TS 22.278 V16.2.0, Mar. 2019, 50 pages, http://www.3gpp.org/ftp//Specs/archive/22_series/22.278/22278-g20.zip.

3rd Generation Partnership Project (3GPP), Technical Specification (TS) Group Services and System Aspects, "Architecture enhancements for V2X services", TS 23.285 V16.0.0, Mar. 2019, 37 pages, http://www.3gpp.org/ftp//Specs/archive/23_series/23.285/23285-g00.zip.

3rd Generation Partnership Project (3GPP), Technical Specification (TS) Group Services and System Aspects, "Proximity-based services (ProSe); Stage 2", TS 23.303 V15.1.0, Jun. 2018, 130 pages, http://www.3gpp.org/ftp//Specs/archive/23_series/23.303/23303-f10.zip.

3rd Generation Partnership Project (3GPP), Technical Specification (TS) Group Services and System Aspects, "General Packet Radio Service (GPRS) enhancements for Evolved Universal Terrestrial Radio Access Network (E-UTRAN) access", TS 23.401 V16.3.0, Jun. 2019, 423 pages, http://www.3gpp.org/ftp//Specs/archive/23_series/23.401/23401-g30.zip.

3rd Generation Partnership Project (3GPP), Technical Specification (TS) Group Services and System Aspects, "Architecture enhancements to facilitate communications with packet data networks and applications", TS 23.682 V16.3.0, Jun. 2019, 132 pages, http://www.3gpp.org/ftp//Specs/archive/23_series/23.682/23682-g30.zip.

3rd Generation Partnership Project (3GPP), Technical Specification (TS) Group Core Network and Terminals, "Proximity-services (ProSe) User Equipment (UE) to ProSe function protocol aspects; Stage 3", TS 24.334 V15.2.0, Sep. 2018, 264 pages, http://www.3gpp.org/ftp//Specs/archive/24_series/24.334/24334-f20.zip.

3rd Generation Partnership Project (3GPP), Technical Specification (TS) Group Core Network and Terminals, "User Equipment (UE) to V2X control function; protocol aspects; Stage 3", TS 24.386 V15.2.0, Dec. 2018, 35 pages, http://www.3gpp.org/ftp//Specs/archive/24_series/24.386/24386-f20.zip.

3rd Generation Partnership Project (3GPP), Technical Specification (TS) Group Core Network and Terminals, "Proximity-services (ProSe) function to ProSe application server aspects (PC2); Stage 3", TS 29.343 V15.0.0, Jun. 2018, 39 pages, http://www.3gpp.org/ftp//Specs/archive/29_series/29.343/29343-f00.zip.

3rd Generation Partnership Project (3GPP), Technical Specification (TS) Group Core Network and Terminals, "Inter-Proximity-services (ProSe) Function signalling aspects; Stage 3", TS 29.345 V15.0.0, Dec. 2017, 35 pages, http://www.3gpp.org/ftp//Specs/archive/29_series/29.345/29345-f00.zip.

3rd Generation Partnership Project (3GPP), Technical Specification (TS) Group Radio Access Network, "Evolved Universal Terrestrial Radio Access (E-UTRA) and Evolved Universal Terrestrial Radio Access Network (E-UTRAN); Overall description; Stage 2", TS 36.300 V15.6.0, Jun. 2019, 365 pages, http://www.3gpp.org/ftp//Specs/archive/36_series/36.300/36300-f60.zip.

3rd Generation Partnership Project (3GPP), Technical Specification (TS) Group Radio Access Network, "Evolved Universal Terrestrial Radio Access (E-UTRA); User Equipment (UE) radio access capabilities", TS 36.306 TS V15.5.0, Jun. 2019, 120 pages, http://www.3gpp.org/ftp//Specs/archive/36_series/36.306/36306-f50.zip.

3rd Generation Partnership Project (3GPP), Technical Specification (TS) Group Radio Access Network, "Evolved Universal Terrestrial Radio Access (E-UTRA); Radio Resource Control (RRC); Protocol specification", TS 36.331 TS V15.6.0, Jun. 2019, 960 pages, http://www.3gpp.org/ftp//Specs/archive/36_series/36.331/36331-f60.zip.

Cheng Wang et al., Estimating Travel speed via Sparse Vehicle Crowd-sourcing Data (2016)(pp. 643-648).

* cited by examiner

100

200

300

400

500

600

EFFICIENT REAL TIME VEHICULAR TRAFFIC REPORTING AND SHARING

CROSS-REFERENCE TO RELATED APPLICATION

This application is a continuation, under 37 CFR 1.53(b), of co-assigned U.S. patent application Ser. No. 16/543,525 of inventor Saran Khalid, and claims the benefit thereof, said application Ser. No. 16/543,525 having been filed on Aug. 17, 2019, and entitled "EFFICIENT REAL TIME VEHICULAR TRAFFIC REPORTING AND SHARING OVER NB-IOT USING D2D." The complete disclosure of the aforesaid application Ser. No. 16/543,525 is expressly incorporated herein by reference in its entirety for all purposes.

FIELD OF THE INVENTION

The present invention relates generally to the electrical, electronic, and computer arts, and more particularly relates to communications networking for vehicular traffic.

BACKGROUND OF THE INVENTION

In conventional vehicle tracking applications, such as computer-assisted navigation or fleet management, the speed of an automobile or other vehicle is measured using GPS (global positioning system) or triangulation methods in mobile communication. These methods determine the speed of the vehicle by estimating the location of the vehicle relative to its previous location over time. Meanwhile, the actual vehicular speed is reported to an in-vehicle controller which is then displayed to the driver on the dashboard. Thus, a more accurate vehicular speed can be extracted from the vehicle itself.

SUMMARY OF THE INVENTION

In one aspect, an exemplary method for sharing traffic data among a plurality of vehicles includes: a first vehicle receiving current traffic data from at least a second vehicle over a first network protocol; the first vehicle transmitting current traffic data from the first vehicle and the current traffic data received from at least the second vehicle to a roadside unit over a second network protocol; the first vehicle receiving processed traffic data from the roadside unit over the second network protocol, the processed traffic data being based on the current traffic data received from the first vehicle and from at least the second vehicle; and the first vehicle transmitting the processed traffic data received from the roadside unit to at least the second vehicle over the first network protocol.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide efficient real-time vehicular traffic reporting and sharing in a manner which avoids excess network traffic congestion.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
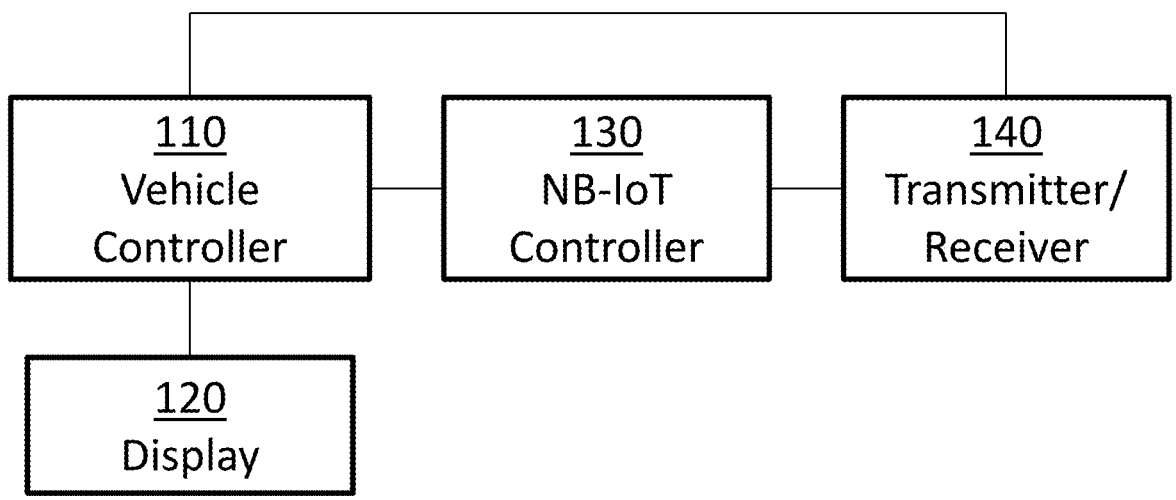
FIG. 1 is a block diagram of a computer system implemented within a vehicle in accordance with one or more aspects of the invention.

Although embodiments of the present invention are primarily described with reference to motorized vehicles such as an automobile, one skilled in the art will understand will understand that aspects of the present invention may be implemented with any one of a variety of motorized and/or operator-powered vehicles, including but not limited to cars, trucks, motorcycles, mopeds, bicycles, and scooters. As used herein, the term D2D (Device-to-Device) shall be construed as including, but not limited to, machine-to-machine, V2V (Vehicle-to-Vehicle) and V2P (Vehicle-to-Passenger). Moreover, although reference is made herein to NB-IoT (NarrowBand Internet of Things), one skilled in the art will understand that aspects of the invention may be more generally applicable to other protocols, such as CIoT (Cellular Internet of Things).

Reference is made herein to various 3rd Generation Partnership Project (3GPP) Technical Specifications (TS), including 3GPP TS 22.185, 3GPP TS 22.186, 3GPP TS 22.278, 3GPP TS 23.285, 3GPP TS 23.303, 3GPP TS 23.401, 3GPP TS 23.682, 3GPP TS 24.334, 3GPP TS 24.386, 3GPP TS 29.343, 3GPP TS 29.345, 3GPP TS 36.300, 3GPP TS 36.306, and 3GPP TS 36.331, all versions of which are expressly incorporated herein by reference in their entireties for all purposes. These references should generally be construed as indicating the most recently published versions of these specifications as of the filing date of the present application, usually Release 15 and/or Release 16. However, one skilled in the art will understand that earlier versions of these specifications, as well as other related documents not specifically referred to herein, may also be used when implementing aspects of the present invention. All versions of the aforementioned 3GPP Technical Specifications, including but not limited to versions associated with Releases 15 and 16, are expressly incorporated herein by reference in their entireties for all purposes.

In accordance with embodiments of the invention, a vehicle may be operative to exchange information with a roadside unit (RSU), such as a cellular tower, over an NB-IoT interface. Thus, NB-IoT may be used to facilitate vehicle-to-infrastructure (V2I) and/or vehicle-to-network (V2N) communication. The vehicle may also be operative to exchange information with other nearby vehicles or pedestrians using a device-to-device (D2D) sidelink, e.g., PC5 interface and/or proximity-based services (ProSe). Thus, a D2D sidelink (e.g., PC5 and/or ProSe) may be used to facilitate vehicle-to-vehicle (V2V) and/or vehicle-to-pedestrian (V2P) communication.

Exemplary aspects of NB-IoT communication suitable for use with an embodiment of the present invention are discussed in, for example, 3GPP TS 23.401, 3GPP TS 23.682, 3GPP TS 36.300, 3GPP TS 36.306, and 3GPP TS 36.331, all versions of which are expressly incorporated herein by reference in their entireties for all purposes. Exemplary aspects of D2D sidelink communication, such as PC5 and/or ProSe, suitable for use with an embodiment of the present invention are discussed in, for example, 3GPP TS 22.278, 3GPP TS 23.285, 3GPP TS 23.303, 3GPP TS 24.334, 3GPP TS 24.386, 3GPP TS 29.343, 3GPP TS 29.345, 3GPP TS 36.300, 3GPP TS 36.306, and 3GPP TS 36.331, all versions of which are expressly incorporated herein by reference in their entireties for all purposes.

Notably, embodiments of the present invention combine NB-IoT and sidelink communication (e.g., PC5 and/or ProSe) within a V2X (vehicle-to-everything) context, notwithstanding the teaching away of the prior art. See, e.g., 3GPP TS 36.331 § 4.1 ("NB-IoT is a non backward compatible variant of E-UTRAN supporting a reduced set of functionality . . . . In particular, the following features are not supported in NB-IoT and corresponding procedures and messages do not apply to the UE in NB-IoT: . . . . Sidelink (including direct communication and direct discovery).") and 3GPP TS 36.300 § 4.10 ("[A] number of functions including . . . sidelink communication/discovery, V2X sidelink communication . . . are not supported for NB-IoT.") See also 3GPP TS 23.285 § 4.1 ("ProSe discovery feature (TS 23.303 . . . clause 5.3 ProSe Direct Discovery) is not required for V2X Services.")

FIG. 1 is a block diagram of a computer system implemented within a vehicle in accordance with one or more aspects of the invention. A vehicle's speed is reported to a vehicle (e.g., car) controller 110, which may comprise and/or be a component of an electronic control unit (ECU). The reported speed may be determined, for example, by counting the number of rotations of an axle or wheel over a given unit of time. The speed may be displayed to an operator of the vehicle on display 120 which may be, for example, a speedometer (analog or digital) implemented on a dashboard and/or heads-up display (HUD) of the vehicle. The speed may also be provided by the vehicle controller 120 to a narrowband Internet-of-Things (NB-IoT) controller 130. NB-IoT controller 130 may comprise and/or be a component of a telematic control unit (TCU).

NB-IoT 130 may then, via transmitter/receiver (transceiver) 140, send this speed information over the air back to a central location—such as an evolved packet core (EPC)—via a roadside unit (RSU). The data from each car is valid for a short duration of time for efficient and accurate traffic information. However, at the central location, this data could be averaged over time and used as historical data to predict estimated time in the future. After the information is consolidated at the central location to determine the average speed for all vehicles on the road, the average speed information is then sent back from the EPC to vehicles over NB-IoT (e.g., via transceiver 140 and NB-IoT controller 130) where vehicle controller 120 can use this average speed to compute an estimated time of arrival (ETA), which can be shown on a display 120, e.g., on a dashboard.

To transfer the data to a central location, statistics and manual control NB-IoT is used. NB-IoT uses signaling messages instead of regular long-term evolution (LTE) data bearers. This allows for infrequent and small data transfers in a fast and very efficient manner. NB-IoT is very low cost and requires very little maintenance, e.g., a mean time between failures (MBTF) of up to several years.

Embodiments of the present invention may relieve data traffic congestion between the vehicles and the EPC by leveraging D2D communication (e.g., sidelinks) between the vehicles and/or other user equipment (UE). Vehicles with real-time traffic information can share this information with other vehicles and pedestrians nearby using D2D sidelink communications for peer discovery and sharing. All UEs discover and share traffic information such as ETA, time on the street, distance, direction and speed, etc. using guardband implementation. After the vehicles share the information amongst themselves using D2D sidelink communication, a vehicle can use NB-IoT to send the data to a central location for further processing. This vehicle can then distribute the processed data received from the central location to the other vehicles using D2D sidelink communication. This in-band D2D communication can enable devices to carry calculations on their own with minimal involvement from the central network (e.g., EPC) itself, thereby providing data traffic congestion relief to reduce the burden on the network.

Figure 2:
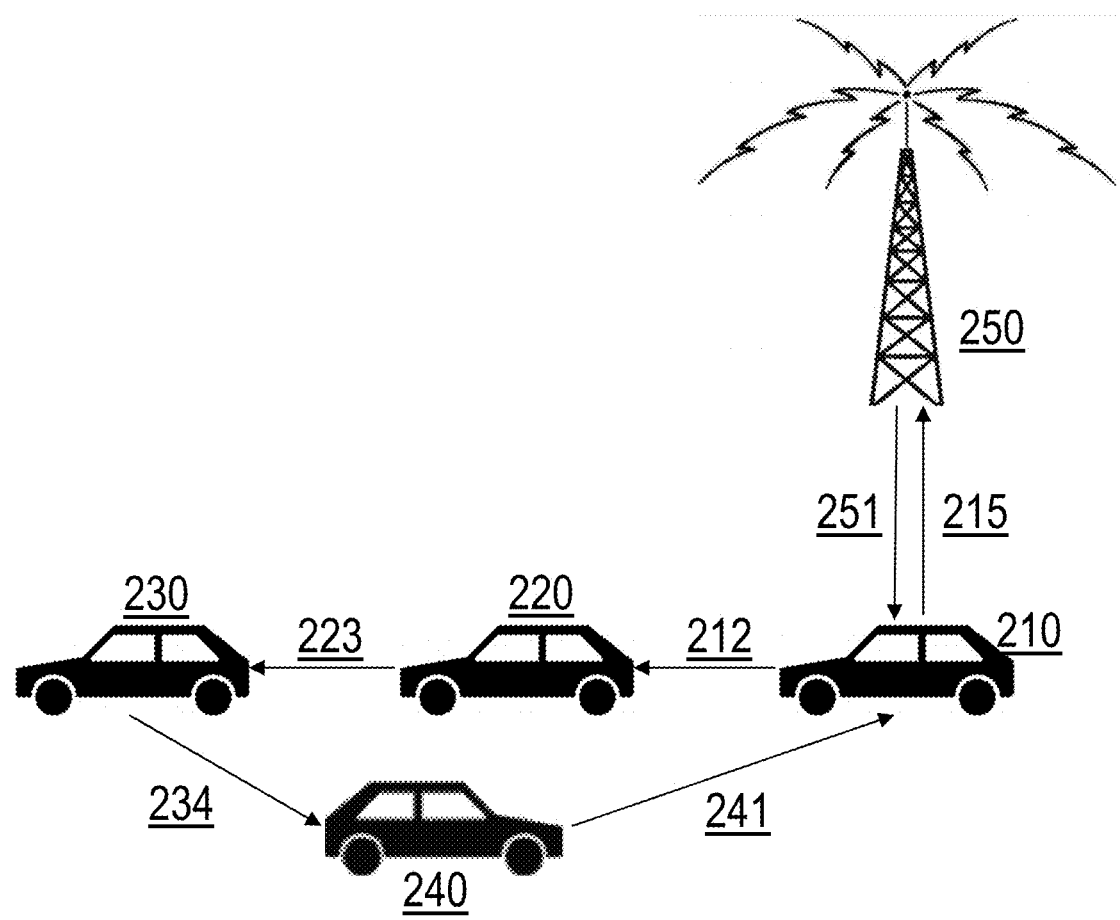
FIG. 2 is a diagram showing communication between network nodes in accordance with one or more aspects of the invention.

FIG. 2 is a diagram showing communication between network nodes in accordance with one or more aspects of the invention. Although FIG. 2 shows an arrangement with four vehicles, embodiments may be used with any number of vehicles. RSU 250, which could be a cellular tower linked to an EPC, provides traffic data over NB-IoT communication link 251 to a first vehicle 210. A second vehicle 220 can use a peer discovery method to find D2D connections. The second vehicle 220 will discover the first car 210 and a third car 230. The second car 220 can then establish respective D2D communication links (sidelinks) 212 and 223 with the first car 210 and the third car 230. The second car 220 can receive 212 traffic information from the first car 210, and the second car can share 223 its speed and other information with the third car 230. The third car 230 can collect information from nearby vehicles and propagate back to the first car 210 via D2D sidelink 234, fourth car 240, and D2D sidelink 241. The first car 210 can then send the collected information back to the RSU 250 via NB-IoT communication link 215. This collected information could be processed at a central location (e.g., an EPC) and then transmitted back to the first car 210 via NB-IoT link 251, which in turn can share the information with the other cars 220, 230, 240 through D2D sidelinks 212, 223, 234, 241.

An exemplary embodiment may implement the D2D sidelinks using the PC5 interface and/or proximity-based services (ProSe) protocol described in, e.g., 3GPP TS 22.278, 3GPP TS 23.285, 3GPP TS 23.303, 3GPP TS 24.334, 3GPP TS 24.386, 3GPP TS 29.343, 3GPP TS 29.345, 3GPP TS 36.300, 3GPP TS 36.306, and 3GPP TS 36.331, all versions of which are expressly incorporated herein by reference in their entireties for all purposes. In an illustrative embodiment, these sidelinks can be one-hop or multi-hop based on a time- and/or distance-based parameter which controls how far the information can propagate before it is deemed outdated. Thus, an embodiment may include an agent on the user equipment (UE) (e.g., vehicles 210, 220, 230 and/or 240) which is capable of making decisions such as when and how long to look for a peer, as well as determining whether the information is accurate and should be accepted. If, as defined by parameters in the agent, the information is outdated or deemed inaccurate, it is discarded and the UE will look for a direct link to another UE, or will receive/transmit information over NB-IoT with the cellular network 250.

Figure 3:
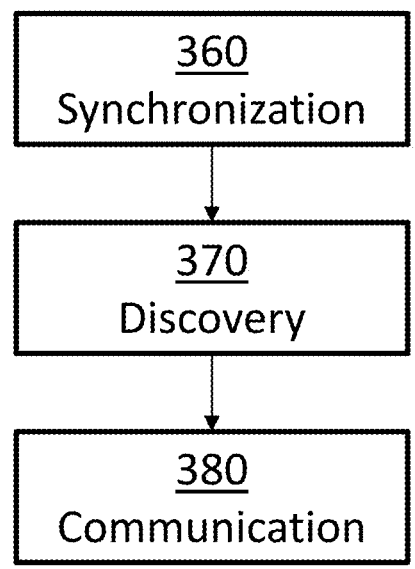
FIG. 3 is a flowchart showing a network connection process in accordance with one or more aspects of the invention.

FIG. 3 is a flowchart showing a D2D connection process in accordance with one or more aspects of the invention. In step 360, synchronization is obtained using a sidelink synchronization signal (SLSS), as discussed in 3GPP TS 36.331 § 5.10, with pre-configured parameters such as Group ID, multicast addresses, and security. In autonomous mode, one of the D2D enabled cars (e.g., 210 in FIG. 2) will be the sync source (leader), while the remaining cars (e.g., 220, 230, 240 in FIG. 2) will detect the presence of the sync broadcast and sync to that leader. The leader UE will distribute pre-configured parameters to the rest of the UEs, however in the event that the leader UE fails, another UE will assume the leader role. In step 370, discovery request and discovery response message exchange is used to discover other devices in the vicinity. In step 380, the UEs (e.g., vehicles) exchange real-time traffic information before the leader sends the collected information to the EPC. The leader then receives results from the EPC and distributes these results to the other vehicles.

Figure 4:
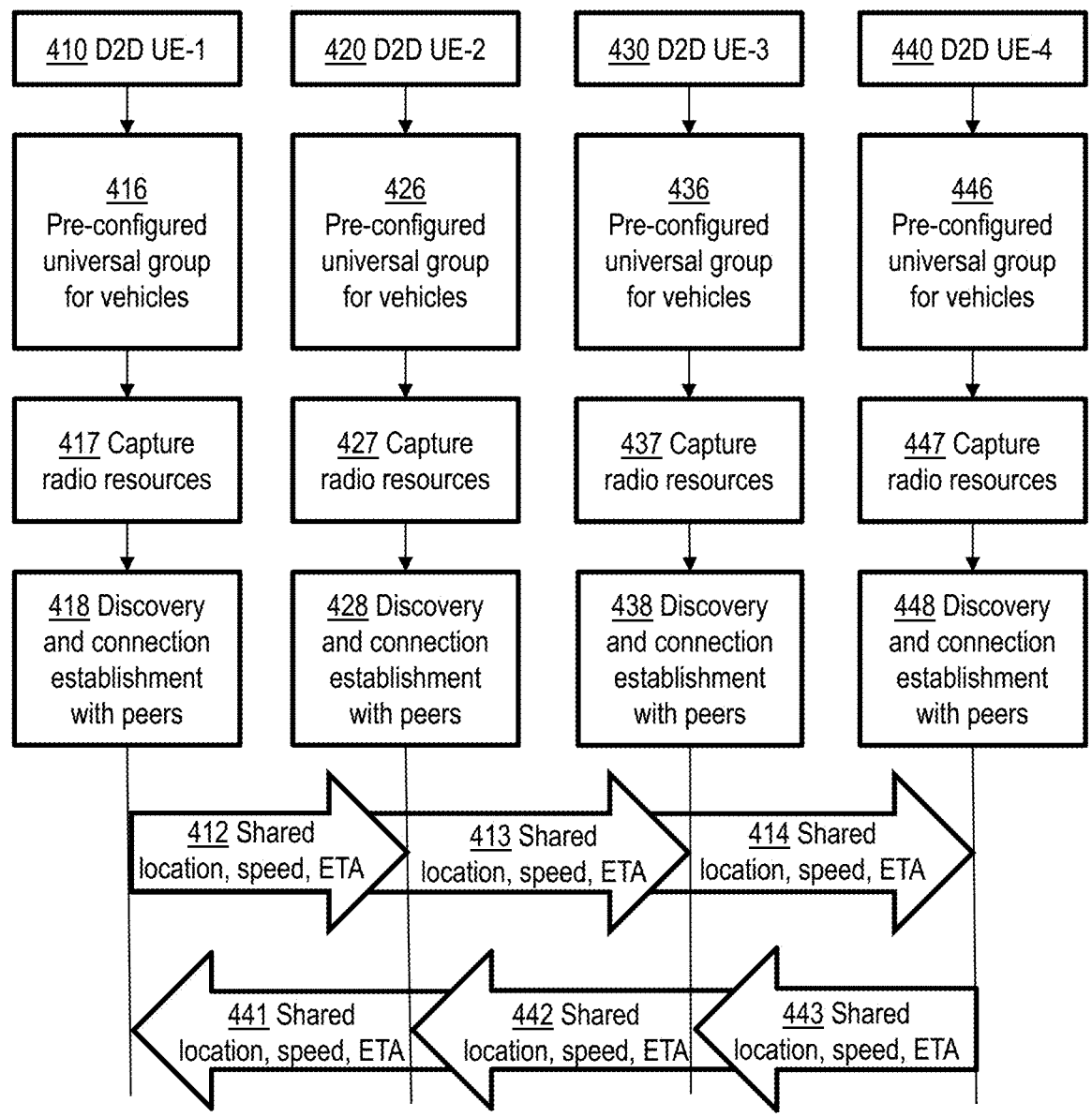
FIG. 4 is a diagram showing communication between network nodes in accordance with one or more aspects of the invention.

FIG. 4 is a diagram showing communication between network nodes in accordance with one or more aspects of the invention. Although FIG. 4 shows an arrangement with four UEs, embodiments may be used with any number of UEs. UEs 410, 420, 430, and 440 in FIG. 4 may correspond generally to vehicles 210, 220, 230, and 240 in FIG. 2. In 416, 426, 436, and 446, the UEs are pre-configured with a universal group for vehicles, and may generally correspond to step 360 in FIG. 3. In 417, 427, 437, and 447, radio resources are captured. Steps 418, 428, 438, and 448 include discovery and connection establishment with peers, and may generally correspond to step 370 in FIG. 3.

Flows 412, 413, and 414 represent sharing of real-time traffic data (such as location, speed, and ETA) from UE 410 to UEs 420, 430, and 440, respectively. Flows 441, 442, and 443 represent sharing of real-time traffic data (such as location, speed, and ETA) from UE 440 to UEs 410, 420, and 430, respectively. Although not shown in FIG. 4, it may be understood that UEs 420 and/or 430 may similarly share real-time traffic data (such as location, speed, and ETA) with each other and/or with UEs 410 and/or 440.

Figure 5:
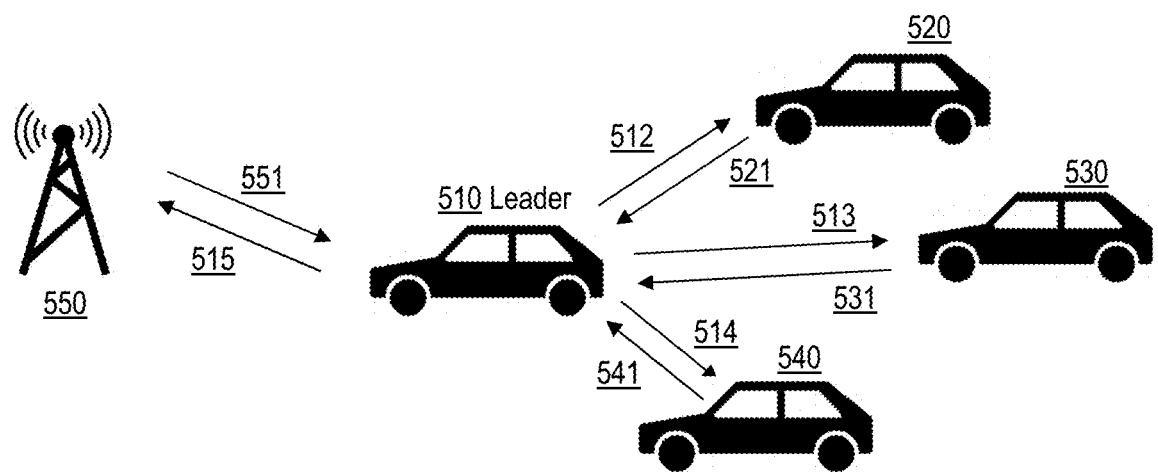
FIG. 5 is a diagram showing communication between network nodes in accordance with one or more aspects of the invention.

FIG. 5 is a diagram showing communication between network nodes in accordance with one or more aspects of the invention. Although FIG. 5 shows an arrangement with four UEs, embodiments may be used with any number of UEs. RSU 550 may be a cellular tower coupled to an EPC, and may correspond to RSU 150 in FIG. 1. Vehicles 510, 520, 530, and 540 may generally correspond to vehicles 210, 220, 230, and 240 in FIG. 2 and/or to UEs 410, 420, 430, and 440 in FIG. 4. Leader vehicle 551 may collect real-time traffic data (e.g., current speed) from the other vehicles 520, 530, and 540 over respective D2D links 521, 531, and 541. Leader vehicle 510 may transmit the collected traffic data to RSU 550 over NB-IoT link 515. After the collected traffic data (e.g., current speed of each vehicle) has been processed (e.g., by EPC coupled to RSU 550), RSU 550 may transmit the processed traffic data (e.g., average speed of all vehicles) to leader vehicle 510 over NB-IoT link 551. Leader vehicle 510 may then distribute the data received from RSU 550 over NB-IoT link 551 to the other vehicles 520, 530, and 540 over respective D2D links 512, 513, and 514.

Figure 6:
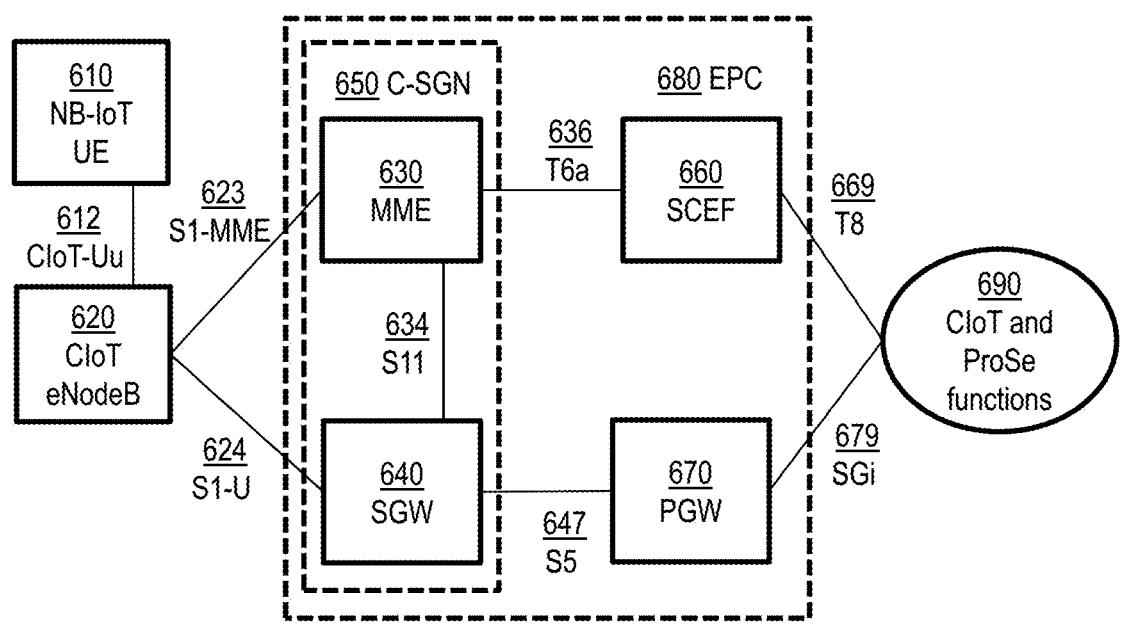
FIG. 6 is a diagram showing an exemplary network architecture in accordance with one or more aspects of the invention.

FIG. 6 is a diagram showing an exemplary network architecture in accordance with one or more aspects of the invention. Element 610 is user equipment that supports NB-IoT, and may correspond to 210 in FIG. 2, 410 in FIG. 4, and/or 510 in FIG. 5. Element 620 is a cellular Internet-of-Things (CIoT) eNodeB, and may correspond to 250 in FIG. 2 and/or 550 in FIG. 5. NB-IoT UE 610 and CIoT eNodeB 620 communicate over CIoT-Uu interface 612 as described in, e.g., 3GPP TS 23.401 § L.1. eNodeB 620 communicates with mobility management entity (MME) 630 over S1-MME interface 623, and with serving gateway (SGW) 640 over S1-U interface 624, as described in, e.g., 3GPP TS 23.401 §§ 4.2.1 and 4.2.3. MME 630 and SGW 640 communicate with one another over S11 interface 634, as described in, e.g., 3GPP TS 23.401 §§ 4.2.1, 4.2.3, and 4.4.2. CIoT serving gateway node (C-SGN) 650 may comprise MME 630 and SGW 640 as described in, e.g., 3GPP TS 23.401 §§ 4.4.2 and L.4.

MME 630 communicates with service capability exposure function (SCEF) 660 over T6a interface 636, as described in, e.g., 3GPP TS 23.401 § L.1 and 3GPP TS 23.682. SGW 640 communicates with packet data network gateway (PGW) 670 over S5 interface, as described in, e.g., 3GPP TS 23.401 §§ 4.2.1, 4.2.3, and 4.4.3. Evolved packet core (EPC) 680 may comprise MME 630, SGW 640, SCEF 660, and PGW 670, as described in, e.g., 3GPP TS 22.278. Element 690 implements CIoT and proximity-based services (ProSe) functions and may include a Services Capability Server (SCS) and/or Application Server (AS), as described in, e.g., 3GPP TS 23.682. SCEF 660 and element 690 communicate over T8 interface 669, and PGW 670 and element 690 communicate over SGi interface 678, as described in, e.g., 3GPP TS 23.401 §§ 4.2.1 and 4.2.3.

Recapitulation

Given the discussion thus far, it will be appreciated that, in general terms, according to an aspect of the invention, an exemplary method for sharing traffic data among a plurality of vehicles, includes: a first vehicle receiving current traffic data from at least a second vehicle over a first network protocol; the first vehicle transmitting current traffic data from the first vehicle and the current traffic data received from at least the second vehicle to a roadside unit over a second network protocol; the first vehicle receiving processed traffic data from the roadside unit over the second network protocol, the processed traffic data being based on the current traffic data received from the first vehicle and from at least the second vehicle; and the first vehicle transmitting the processed traffic data received from the roadside unit to at least the second vehicle over the first network protocol.

In another aspect, an exemplary apparatus implemented within a first vehicle comprises a memory and at least one processor coupled to the memory. The processor is operative: to receive current traffic data from at least a second vehicle over a first network protocol; to transmit current traffic data from the first vehicle and the current traffic data received from at least the second vehicle to a roadside unit over a second network protocol; to receive processed traffic data from the roadside unit over the second network protocol, the processed traffic data being based on the current traffic data received from the first vehicle and from at least the second vehicle; and to transmit the processed traffic data received from the roadside unit to at least the second vehicle over the first network protocol. A further aspect may include a computer program product usable within a first vehicle. The computer program comprises a non-transitory machine-readable storage medium having machine-readable program code embodied therewith, said machine-readable program code comprising machine-readable program code configured: to receive current traffic data from at least a second vehicle over a first network protocol; to transmit current traffic data from the first vehicle and the current traffic data received from at least the second vehicle to a roadside unit over a second network protocol; to receive processed traffic data from the roadside unit over the second network protocol, the processed traffic data being based on the current traffic data received from the first vehicle and from at least the second vehicle; and to transmit the processed traffic data received from the roadside unit to at least the second vehicle over the first network protocol.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
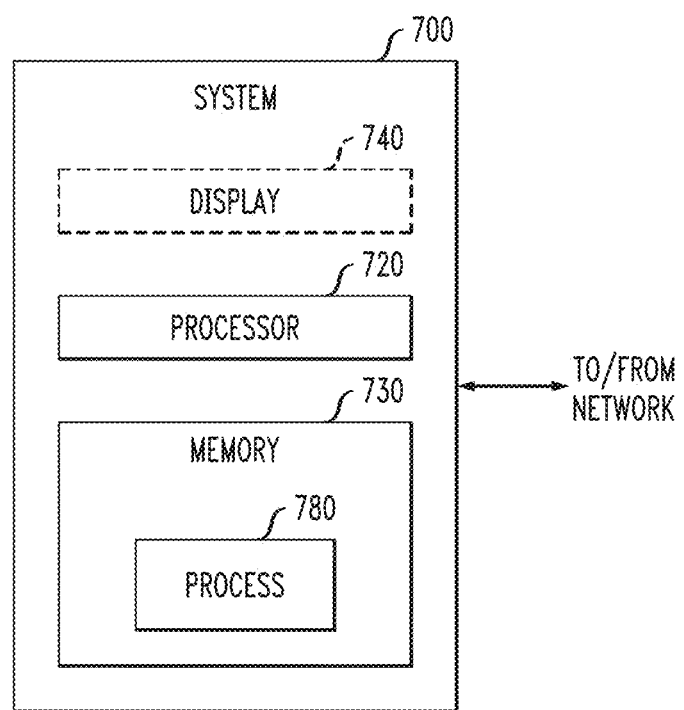
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for sharing traffic data among a plurality of vehicles, comprising:
    a first vehicle receiving current traffic data from at least a second vehicle over a first protocol, the current traffic data received from the second vehicle including speed of the second vehicle;
    the first vehicle transmitting current traffic data from the first vehicle, including speed of the first vehicle, and the current traffic data received from at least the second vehicle to a roadside unit over a second protocol;
    the first vehicle receiving processed traffic data, including average speed of the at least first and second vehicles, from the roadside unit over the second protocol, the processed traffic data being based on the current traffic data received from the first vehicle and from at least the second vehicle; and
    the first vehicle transmitting the processed traffic data, including average speed of the at least first and second vehicles, received from the roadside unit, to at least the second vehicle over the first protocol.

2. The method of claim 1, wherein the first protocol comprises a proximity-based services (ProSe) protocol.

3. The method of claim 1, wherein the second protocol comprises a cellular Internet-of-Things (CIoT) protocol.

4. The method of claim 1, wherein the second vehicle does not communicate with the roadside unit other than via the first vehicle.

5. The method of claim 1, wherein the roadside unit comprises a cellular tower.

6. The method of claim 1, wherein the roadside unit comprises an eNodeB coupled to an Evolved Packet Core (EPC), and wherein the traffic data received by the roadside unit from at least the first vehicle is processed by the EPC.

7. The method of claim 6, wherein the EPC comprises a CIoT serving gateway node (C-SGN) coupled to a service capability exposure function (SCEF).

8. The method of claim 7, wherein the C-SGN comprises a mobility management entity (MME) and a serving gateway (SGW), wherein the SCEF is coupled to the MME, and wherein the EPC further comprises a packet traffic data network gateway (PGW) coupled to the SGW.

9. The method of claim 1, wherein the first vehicle is a synchronization source, and wherein the at least second vehicle synchronizes to the first vehicle upon detecting a synchronization broadcast signal transmitted by the first vehicle.

10. The method of claim 9, wherein the synchronization broadcast signal comprises a sidelink synchronization signal (SLSS) with one or more pre-configured parameters.

11. The method of claim 10, wherein the one or more pre-configured parameters comprise a universal group identifier and multicast addresses.

12. The method of claim 10, wherein upon the second vehicle detecting a failure of the first vehicle as the synchronization source, the second vehicle becomes the synchronization source and transmits the synchronization broadcast signal.

13. The method of claim 1, wherein:
    the second vehicle receives current traffic data from at least a third vehicle over the first network protocol;
    the second vehicle transmits current traffic data from the second vehicle and the current traffic data received from the third vehicle to the first vehicle over the first protocol;
    the first vehicle transmits the current traffic data from the first vehicle, the current traffic data from the second vehicle, and the current traffic data from the third vehicle to the roadside unit over the second protocol;
    the processed traffic data received by the first vehicle from the roadside unit over the second protocol is based on the current traffic data from the first vehicle, the current traffic data from the second vehicle, and the current traffic data from the third vehicle; and the second vehicle transmits the processed traffic data received from the first vehicle to at least the third vehicle over the first protocol.

14. The method of claim 13, wherein the third vehicle does not communicate with the first vehicle other than via the second vehicle.

15. The method of claim 13, wherein the second vehicle transmits the current traffic data received from the third vehicle to the first vehicle only if the second vehicle determines that the current traffic data from the third vehicle satisfies an accuracy criterion based on at least one of time and distance.

16. An apparatus implemented within a first vehicle comprising:
a memory; and
at least one processor coupled to the memory, the processor being operative:
to receive current traffic data from at least a second vehicle over a first protocol, the current traffic data received from the second vehicle including speed of the second vehicle;
to transmit current traffic data from the first vehicle, including speed of the first vehicle, and the current traffic data received from at least the second vehicle to a roadside unit over a second protocol;
to receive processed traffic data, including average speed of the at least first and second vehicles, from the roadside unit over the second protocol, the processed traffic data being based on the current traffic data received from the first vehicle and from at least the second vehicle; and
to transmit the processed traffic data, including average speed of the at least first and second vehicles, received from the roadside unit to at least the second vehicle over the first protocol.

17. A computer program product usable within a first vehicle, the computer program product comprising a non-transitory machine-readable storage medium having machine-readable program code embodied therewith, said machine-readable program code comprising machine-readable program code configured:
to receive current traffic data from at least a second vehicle over a first protocol, the current traffic data received from the second vehicle including speed of the second vehicle;
to transmit current traffic data from the first vehicle, including speed of the first vehicle, and the current traffic data received from at least the second vehicle to a roadside unit over a second protocol;
to receive processed traffic data, including average speed of the at least first and second vehicles, from the roadside unit over the second protocol, the processed traffic data being based on the current traffic data received from the first vehicle and from at least the second vehicle; and
to transmit the processed traffic data, including average speed of the at least first and second vehicles, received from the roadside unit to at least the second vehicle over the first protocol.

* * * * *